(12) United States Patent
Yokoyama et al.

(10) Patent No.: US 9,428,670 B2
(45) Date of Patent: Aug. 30, 2016

(54) PROCESS OF FORMING A COATING ON A SUBSTRATE

(71) Applicant: AXALTA COATING SYSTEMS IP CO., LLC, Wilmington, DE (US)

(72) Inventors: Ayumu Yokoyama, Media, PA (US); Eric C. Houze, Mullica Hill, NJ (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 145 days.

(21) Appl. No.: 14/387,997

(22) PCT Filed: Jan. 29, 2013

(86) PCT No.: PCT/US2013/023600
§ 371 (c)(1),
(2) Date: Sep. 25, 2014

(87) PCT Pub. No.: WO2013/147988
PCT Pub. Date: Oct. 3, 2013

(65) Prior Publication Data
US 2015/0050423 A1 Feb. 19, 2015

Related U.S. Application Data

(60) Provisional application No. 61/617,287, filed on Mar. 29, 2012.

(51) Int. Cl.
*C09D 175/12* (2006.01)
*C09D 175/04* (2006.01)
*C09D 5/02* (2006.01)
*C08K 5/3492* (2006.01)

(52) U.S. Cl.
CPC .......... *C09D 175/12* (2013.01); *C08K 5/34922* (2013.01); *C09D 5/024* (2013.01); *C09D 175/04* (2013.01)

(58) Field of Classification Search
None
See application file for complete search history.

(56) References Cited

U.S. PATENT DOCUMENTS

| 5,594,065 | A | * | 1/1997 | Tien | C08G 18/0823 524/457 |
| 5,910,556 | A | * | 6/1999 | Wamprecht | B01F 17/005 528/49 |
| 6,079,868 | A | * | 6/2000 | Rydell | A61B 17/00234 222/145.6 |
| 6,177,488 | B1 | | 1/2001 | Kasari et al. | |
| 6,268,429 | B1 | | 7/2001 | Mitsuji et al. | |
| 7,019,070 | B2 | | 3/2006 | Chung et al. | |
| 2003/0232920 | A1 | * | 12/2003 | Chung | C08G 18/0823 524/839 |
| 2004/0053056 | A1 | | 3/2004 | Rardon et al. | |
| 2012/0046403 | A1 | | 2/2012 | Tsukuma et al. | |

FOREIGN PATENT DOCUMENTS

EP 0742239 A1 11/1996

OTHER PUBLICATIONS

ISA KIPO, International Preliminary Report on Patentability for International Application No. PCT/US2013/023600, dated Oct. 9, 2014.
ISA KIPO, International Search Report and Written Opinion for International Application No. PCT/US2013/023600, dated Jun. 21, 2013.

* cited by examiner

*Primary Examiner* — Erma Cameron
(74) *Attorney, Agent, or Firm* — Ingrassia Fisher & Lorenz, P.C.

(57) ABSTRACT

The present disclosure relates to a process for forming a layer of a coating composition on a substrate wherein the coating composition comprises a waterborne film forming polymer, an isocyanate and a melamine. The process involves forming a mixture of the waterborne film forming polymer and the isocyanate and allowing the mixture to mature before adding the melamine component. The result is a layer of the coating composition with a high degree of gloss and gassing resistance.

20 Claims, No Drawings

PROCESS OF FORMING A COATING ON A SUBSTRATE

CROSS-REFERENCE TO RELATED APPLICATION

This application is a U.S. National-Stage entry under 35 U.S.C. §371 based on International Application No. PCT/US2013/023600, filed Jan. 29, 2013, which was published under PCT Article 21(2) and which claims priority to U.S. Provisional Application No. 61/617,287, filed Mar. 29, 2012, which are all hereby incorporated in their entirety by reference.

TECHNICAL FIELD

The present disclosure is directed to a process for forming a layer of a coating composition on a substrate wherein the coating composition comprises a waterborne film-forming polymer, a polyisocyanate and an alkylated melamine. The composition can further comprise one or more catalysts that promote the formation of the desired crosslinked coating composition.

BACKGROUND

Coating compositions can provide one or more protective layers for an underlying substrate and can also have an aesthetically pleasing value. A typical coating finish over a substrate can comprise some or all of the following coating layers: (1) one or more primer layers that provide adhesion and basic protection, and also cover minor surface unevenness of the substrate; (2) one or more colored layers, typically pigmented, that provide most of the protection, durability and color; and (3) one or more clearcoat layers that provide additional durability and improved appearance. A colored topcoat layer can be used in place of the colored layer and clearcoat layer. These coatings can be used on buildings, machinery, sporting equipment, vehicles as automotive original equipment manufacture (OEM) and refinish coatings, or in other coating applications.

The coatings are typically formed from coating compositions which can be solventborne or waterborne. Solventborne coating compositions typically contain volatile organic compounds (VOC) that are compounds of carbon, which can emit into atmosphere and participate in atmospheric photochemical reactions. Many volatile organic compounds are commonly used in industrial products or processes, such as solvents, dispersants, carriers, coating compositions, molding compositions, cleaners, or aerosols. VOCs emitted into the atmosphere, such as those emitted from coating compositions during coating manufacturing, application and curing processes, can be related to air pollution impacting air quality, participate in photoreactions with air to form ozone, and contribute to urban smog and global warming.

Waterborne coating compositions are desirable due to their low VOC contents. However, waterborne coating compositions can have limitations in terms of storage, processing and handling. There are continuing needs for improved waterborne coating compositions.

SUMMARY

The present disclosure is directed to a coating process comprising the steps of:
forming a first coating mixture, said first coating mixture comprising:
a film forming polymer having at least two different functional groups, a hydroxyl group and an amine neutralized carboxylic acid group, and
a polyisocyanate,
allowing said first coating mixture to mature for about 0.5 to about 60 minutes,
forming a second coating mixture, said second coating mixture comprising:
an alkylated melamine that is essentially unreactive to isocyanates; and
an acid catalyst,
forming a coating composition by mixing together said first coating mixture and said second coating mixture,
applying a layer of the coating composition onto a substrate; and
curing the applied layer of coating composition.

DETAILED DESCRIPTION

The features and advantages of the present disclosure will be more readily understood, by those of ordinary skill in the art, from reading the following detailed description. It is to be appreciated that certain features of the disclosure, which are, for clarity, described above and below in the context of separate embodiments, may also be provided in combination in a single embodiment. Conversely, various features of the disclosure that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including every value between the minimum and maximum values.

As used herein:

"Gloss" means the gloss of a coating and is related to the amount of incident light that is reflected at the specular reflectance angle of the mean of that surface. Gloss can be measured with a specular glossmeter, such as those available from Byk-Gardner, Columbia, Md.

Distinctness of Image (DOI) is a quantitative measure of coating appearance that measures the light reflected at and around the specular reflectance angle. It can be determined according to the method described in ASTM D 5767. DOI can be measured with wave scan instruments, such as those available from Byk-Gardner, Columbia, Md. DOI measures not only the amount of incident light that is reflected at the specular reflectance angle, but also the distribution of the reflected light around the reflectance specular angle, typically +/−0.3° from the specular angle. A coating surface that gives fuzzy or distorted image generally produces lower DOI reading. A coating reflecting 100% of lights at the specular angle gives a DOI reading of 100.

The term "volatile organic compound", "VOC", "volatile organic compounds", or "VOCs" refers to organic chemical compounds of carbon that can vaporize and enter the atmosphere and participate in atmospheric photochemical reactions. VOCs can be naturally occurring or produced from natural or synthetic materials. Some or all VOCs can be regulated under local, national, regional, or international authorities. VOC can be expressed as weight of VOC on a unit of volume of a product, such as grams per liter (g/l). Amounts of VOC in a coating composition can be determined according to ASTM D3960.

The terms (meth)acrylate and (meth)acrylic will be understood to include both acrylate and methacrylate or both acrylic and methacrylic.

The term "film forming polymer having at least two different functional groups" refers to an oligomer or polymer that has at least one hydroxyl functional group and at least one amine neutralized carboxylic acid group. In some embodiments, the film forming binder having at least two different functional groups has at least two hydroxyl functional groups and at least two amine neutralized carboxylic acid functional groups.

This disclosure is directed to a process for forming a layer of a coating composition on a substrate. The process comprises or consists of the steps of:
1) forming a first coating mixture, wherein the first coating mixture comprises:
   A1) a film forming polymer having at least two different functional groups, a hydroxyl group and an amine neutralized carboxylic acid group; and
   A2) a polyisocyanate;
2) allowing the first coating mixture to mature for about 0.5 to about 60 minutes;
3) forming a second coating mixture, wherein the second coating mixture comprises;
   B1) an alkylated melamines that are essentially unreactive to isocyanate functional groups; and
   B2) an acid catalyst;
4) forming the coating composition by mixing together the first coating mixture and the second coating mixture;
5) applying a layer of the coating composition onto the substrate; and
6) curing the applied layer of coating composition.

In another embodiment of the process, the first coating mixture can further comprise a catalyst A3). Also in the above process, the second coating mixture can be prepared at any time during steps 1) or 2), or the second coating mixture may be prepared before step 1). In some embodiments, the second coating mixture can be formed prior to forming the first coating mixture or, in other embodiments, the second coating mixture can be formed during the maturation period of the first coating mixture. In other embodiments, the alkylated melamine and the acid catalyst can be separate components that are added to the first coating mixture to form the coating composition.

The term "mature" or "maturation period" as used herein represents the period of time following the formation of a homogeneous mixture of components A1, A2 and A3, if present, of the first coating mixture and before the addition of the second coating composition. In one example, components A1, A2 and A3 can be added to a suitable mixing vessel and the components can be stirred to form a homogeneous mixture. During the maturation period of the first coating mixture, stirring of the mixture can continue or, in another embodiment, after the formation of the homogeneous mixture, the stirring can be stopped. In some embodiments, the maturation period can be in the range of from about 0.5 to about 60 minutes. In other embodiments, the maturation period can be from about 1 minute to about 45 minutes, and in further embodiments, can be in the range of from about 2 minutes to about 30 minutes.

The first coating mixture comprises or consists of an aqueous mixture of A1, A2 and the optional A3. The film forming polymers A1 are water soluble or water dispersible polymers and can comprise or consist of one or more film forming polymers having at least two different functional groups, wherein one of the functional groups is a hydroxyl group and the second functional group is an amine neutralized carboxylic acid. The film forming polymers can be selected from (meth)acrylic polymers, polyester polymers, polyurethane polymers, alkyd resins, or a combination thereof. In order to form the desired cured coating composition, the film forming polymers should have at least two hydroxyl functional groups per molecule. In some embodiments, the hydroxyl number for the film forming polymer can be in the range of from about 10 to about 200 mg KOH/g polymer. The film forming polymer should also have a sufficient number of amine neutralized carboxylic acid groups to render the film forming polymer water soluble or water dispersible. Prior to the carboxylic acid groups being neutralized with the amine, the acid number of the film forming polymer can be in the range of from about 10 to about 200 mg KOH/g resin. In other embodiments, the hydroxyl number can be in the range of from about 20 to about 180 mg KOH/g resin and the acid number can be in the range of from about 20 to about 180 mg KOH/g resin.

Water soluble or water dispersible film forming polymers that can be used as the film forming polymer A1, are known in the art. The film forming polymers can be (meth)acrylic polymer, polyester polymers, polyurethane polymers, alkyd resins or a combination thereof. In order to be water soluble or water dispersible, the polymers should have a sufficient amount of carboxylic acid or anhydride groups that can be neutralized with an amine compound. The amount of amine neutralized carboxylic acid groups on each molecule can vary depending on many factors including the molecular weight, the polarity of the various comonomers and other factors. While amine neutralized carboxylic acid groups are required to be present in the film forming polymers A1, the film forming polymers may also include one or more polyalkylene glycol repeat units, for example, polyethylene glycol.

In order to help to disperse or solubilize the film forming polymer in water, at least a portion of the carboxylic acid groups can be neutralized with an amine. The portion of carboxylic acid groups that are neutralized with an amine can vary in the range of from about 10 percent to about 100 percent, based on the total amount of carboxylic acid groups on the film forming polymer. In other embodiments, the portion can be in the range of from about 20 to about 90 percent, based on the total amount of carboxylic acid groups on the film forming polymer. Amines that can be used to neutralize the carboxylic acid functional groups are known in the art. In some embodiments, the amine can be, for example, alkyl amines, dialkyl amines, hydroxyl functional alkyl amines or a combination thereof. Suitable hydroxyl functional alkyl amines have a formula according to $RR^1NH$, wherein R and $R^1$ are independently alkyl groups containing in the range of from 1 to 6 carbon atoms wherein at least one of R or $R^1$ contains a hydroxyl group. In some embodiments, both R and $R^1$ contain one hydroxyl group. In further embodiments, the amine can be 2-amino-2-methyl-1-propanol, diethanol amine, n-methyl ethanol amine, n-ethyl ethanol amine, n-methyl-3-amino-1-propanol, n-ethyl-3-amino-1-propanol, dimethyl amine, methyl ethyl amine, diethyl amine, methyl propyl amine, dipropyl amine, dibutyl amine, methyl butyl amine, ethyl amine, propyl amine, butyl amine, or a combination thereof. In some embodiments, the carboxylic acid may be neutralized with ammonia.

Examples of polyisocyanates A2, can include aliphatic polyisocyanates, cycloaliphatic polyisocyanates, aromatic polyisocyanates and isocyanate adducts. Examples of suitable aliphatic, cycloaliphatic and aromatic polyisocyanates that can include: 2,4-toluene diisocyanate, 2,6-toluene diisocyanate, 4,4'-diphenylmethane diisocyanate, 4,4'-dicyclohexyl methane diisocyanate, 3,3'-dimethyl-4,4'-biphenyl diisocyanate, 1,4-benzene diisocyanate, cyclohexane-1,4-diisocyanate, 1,5-naphthalene diisocyanate, 1,6-hexamethylene diisocyanate, 4,6-xylene diisocyanate, isophorone diisocyanate, 1,2-propylene diisocyanate, tetramethylene diisocyanate, 2,3-butylene diisocyanate, octamethylene diisocyanate, 2,2,4-trimethyl hexamethylene diisocyanate, dodecamethylene diisocyanate, omega-dipropyl ether diisocyanate, 1,3-cyclopentane diisocyanate, 1,2-cyclohexane diisocyanate, 1,4-cyclohexane diisocyanate, 4-methyl-1,3-diisocyanatocyclohexane, 3,3'-dimethyl-dicyclohexylmethane 4,4'-diisocyanate, polyisocyanates having isocyanurate structural units, such as, the isocyanurate of hexamethylene diisocyanate and the isocyanurate of isophorone diisocyanate, the adduct of 2 molecules of a diisocyanate, such as, hexamethylene diisocyanate, uretidiones of hexamethylene diisocyanate, uretidiones of isophorone diisocyanate and a diol, such as, ethylene glycol, the adduct of 3 molecules of hexamethylene diisocyanate and 1 molecule of water, allophanates, trimers and biurets, for example, of hexamethylene diisocyanate, allophanates, trimers and biurets, for example, of isophorone diisocyanate and the isocyanurate of hexane diisocyanate.

Tri-functional isocyanates can also be used, for example, triphenyl methane triisocyanate, 1,3,5-benzene triisocyanate, 2,4,6-toluene triisocyanate. Trimers of diisocyanates, such as, the trimer of hexamethylene diisocyanate, sold as TOLONATE® HDT from Rhodia Corporation and the trimer of isophorone diisocyanate are also suitable.

An isocyanate functional adduct can be used, for example, adducts of an aliphatic polyisocyanate and a polyol or adducts of an aliphatic polyisocyanate and an amine. Also, any of the aforementioned polyisocyanates can be used with a polyol to form the adduct. Polyols, such as, trimethylol alkanes, particularly, trimethylol propane or ethane can be used to form the adduct.

The first coating mixture can further comprise one or more catalysts A3, that can be selected from organic metal salts, such as, dibutyl tin dilaurate, dibutyl tin diacetate, dibutyl tin dichloride, dibutyl tin dibromide, zinc naphthenate; triphenyl boron, tetraisopropyl titanate, triethanolamine titanate chelate, dibutyl tin dioxide, dibutyl tin dioctoate, tin octoate, aluminum titanate, aluminum chelates, zirconium chelate, hydrocarbon phosphonium halides, such as, ethyl triphenyl phosphonium iodide and other such phosphonium salts and other catalysts, or a combination thereof.

The coating composition also contains a second coating mixture which comprises or consists of an alkylated melamine B1 and an acid catalyst B2. The alkylated melamine B1, is essentially unreactive to an isocyanate. To be "essentially unreactive", a mixture of one or more alkylated melamines B1 and a diisocyanate must stay un-gelled for at least 5 hours from the time of mixing and the viscosity of the mixture remains below about 150% of the initial viscosity for at least 2 hours from the time of mixing at ambient temperatures such as a temperature in a range of from about 15° C. to about 60° C., wherein the initial viscosity is the viscosity of the mixture measured immediately after the one or more melamines and the diisocyanate are just mixed. The mixture can have a weight ratio of the melamine and the diisocyanate in a range of from about 5:1 to about 1:5. In one example, a melamine can be tested for its reactivity towards a diisocyanate by mixing 1 weight part of the melamine and 1 weight part of a diisocyanate, such as 1,6-hexamethylene diisocyanate ("HDI") and measuring the viscosity of the mixture at 0, 2 and 5 hour time point after mixing at ambient temperatures. The melamine can be determined as essentially unreactive to a diisocyanate if the mixture is not gelled after 5 hours and the viscosity at the 2 hour time point remains less than 150% of the initial viscosity measured at the 0 hour time point. Other diisocyanates disclosed in this disclosure or known to or developed by those skilled in the art can also be suitable for testing an alkylated melamine's reactivity.

Any alkylated melamines that are essentially unreactive to a diisocyanate can be suitable. In one example, a suitable alkylated melamine includes CYMEL® XW-3106 melamine, commercially available from Cytec Industries, Inc., Wallingford, Conn. The alkylated melamine can include alkylated melamine aldehyde condensation products or derivatives, such as alkylated melamine formaldehyde. In one example, the alkylated melamines that are essentially unreactive to a diisocyanate can include fully alkylated melamines that are essentially free from isocyanate reactive hydrogens, for example, are free from —OH, —NH or —NH$_2$ groups. The term "essentially free from isocyanate reactive hydrogen" means that the alkylated melamine can have minor amounts of functional groups having the isocyanate reactive hydrogen, such as —OH, —NH or —NH$_2$, and a mixture of the alkylated melamine and the polyisocyanate at ambient temperature does not form gel and the crosslinking component can remain in a low viscosity range suitable for coating applications, such as mixing with a crosslinkable component for spraying, rolling, brushing, dipping, draw-down, or a combination thereof. The alkylated melamine can have in a range of from 0 to about 10 percent in one example, 0 to about 5 percent in another example, 0 to about 1 percent in yet another example, 0 to about 0.1 percent in yet another example, of melamines that have one or more isocyanate reactive hydrogens, wherein the percentages are based on the total weight of melamine in the second coating mixture.

The alkylated melamine can be formed by methods known in the art. In some embodiments, melamine can first be reacted with an excess of one or more C1-05 aldehydes to form alcohols, and then reacted with one or more C1-C10 alkylation agents. The alkylated melamine can comprise alkylation groups selected from one or more C1-C10 alkyls in one example, C1-C5 alkyls in another example. In a further example, the alkylated melamine can comprise methyl groups. In yet another example, the alkylated melamine can comprise butyl groups. In yet another example, the alkylated melamine can comprise a combination of methyl and butyl groups. A melamine having all amine groups alkylated is referred to as a fully alkylated melamine. Examples of fully alkylated melamine can include hexamethoxymethylmelamine, hexabutoxymethylmelamine and melamine having butoxymethyl groups, ethoxymethyl groups, methoxymethyl groups, or a combination thereof.

The coating composition can have a weight ratio of the one or more alkylated melamines:polyisocyanates in a range of from about 1:0.1 to about 1:10. In other examples, the ratio of the alkylated melamine:polyisocyanates can be in a range of from about 1:0.1 to about 1:10, in the range of from about 1:0.5 to about 1:10 in other examples, in the range of from about 1:1 to about 1:10 in still another example, about 1:0.5 to about 1:5, and in the range of from about 1:1 to about 1:5 in yet other examples.

The acid catalyst B2, can be any of those acid catalysts that are common in coating compositions. Suitable acid catalysts can include carboxylic acids, sulfonic acids, phosphoric acids or a combination thereof. In some embodiments, the acid catalyst can include, for example, acetic acid, formic acid, dodecyl benzene sulfonic acid, dinonyl naphthalene sulfonic acid, para-toluene sulfonic acid, phosphoric acid, or a combination thereof.

The process can further comprise the steps of mixing one or more pigments, water, solvents, ultraviolet light stabilizers, ultraviolet light absorbers, antioxidants, hindered amine light stabilizers, leveling agents, rheological agents, thickeners, antifoaming agents, wetting agents, or a combination thereof, into the first coating mixture or the second coating mixture or the coating composition. In another embodiment, the first coating mixture, the second coating mixture or both the first and the second coating mixtures can comprise water, solvents, one or more pigments, ultraviolet light stabilizers, ultraviolet light absorbers, antioxidants, hindered amine light stabilizers, leveling agents, rheological agents, thickeners, antifoaming agents, wetting agents, or a combination thereof.

The coating composition is a waterborne coating composition wherein the water content is greater than about 50 percent by weight, based on the total amount of liquid carrier in the coating composition. In a further embodiment, the water content of the liquid carrier is greater than about 60 percent by weight. In another embodiment, the water content of the liquid carrier is greater than about 70 percent by weight and in a still further embodiment, the water content of the liquid carrier is greater than about 80 percent by weight. In a still further embodiments, the water content of the liquid carrier is greater than about 90 percent by weight or greater than about 95 percent by weight, wherein the percentages by weight are based on the total amount of liquid carrier in the coating composition. The coating composition can further comprise one or more organic solvents. Examples of organic solvents can include, but not limited to, aromatic hydrocarbons, such as, toluene, xylene; ketones, such as, acetone, methyl ethyl ketone, methyl isobutyl ketone, methyl amyl ketone and diisobutyl ketone; esters, such as, ethyl acetate, n-butyl acetate, isobutyl acetate, and a combination thereof.

The coating composition of this invention can be formulated as a clearcoat or pigmented coating composition. Pigmented coating compositions can be used as a primer, a basecoat, or a topcoat, such as colored topcoat. Conventional inorganic and organic colored pigments, metallic flakes and powders, such as, aluminum flake and aluminum powders; special effects pigments, such as, coated mica flakes, coated aluminum flakes colored pigments, or a combination thereof can be used. Transparent pigments or pigments having the same refractive index as the cured binder can also be used. One example of such transparent pigment can be silica.

The coating composition contemplated herein can also comprise one or more ultraviolet light stabilizers. Examples of such ultraviolet light stabilizers can include ultraviolet light absorbers, screeners, quenchers, and hindered amine light stabilizers. An antioxidant can also be added to the coating composition.

Typical ultraviolet light stabilizers that are suitable for use herein can include benzophenones, triazoles, triazines, benzoates, hindered amines and mixtures thereof. A blend of hindered amine light stabilizers, such as TINUVIN® 328 and TINUVIN® 123, all commercially available from Ciba Specialty Chemicals, Tarrytown, N.Y., under respective registered trademark, can be used.

Typical ultraviolet light absorbers that are suitable for use herein can include hydroxyphenyl benzotriazoles, such as, 2-(2-hydroxy-5-methylphenyl)-2H-benzotriazole, 2-(2-hydroxy-3,5-di-tert-amyl-phenyl)-2H-benzotriazole, 2-[2-hydroxy-3,5-di-(1,1-dimethylbenzyl)phenyl]-2H-benzotriazole, reaction product of 2-(2-hydroxy-3-tert-butyl-5-methyl propionate)-2H-benzotriazole and polyethylene ether glycol having a weight average molecular weight of 300, 2-(2-hydroxy-3-tert-butyl-5-iso-octyl propionate)-2H-benzotriazole; hydroxyphenyl s-triazines, such as, 2[4-((2,-hydroxy-3-dodecyloxy/tridecyloxypropyl)-oxy)-2-hydroxyphenyl]-4,6-bis(2,4-dimethylphenyl)-1,3,5-triazine, 2-[4-(2-hydroxy-3-(2-ethylhexyl)-oxy)-2-hydroxyphenyl]-4,6-bis(2,4-dimethylphenyl)1,3,5-triazine, 2-(4-octyloxy-2-hydroxyphenyl)-4,6-bis(2,4-dimethylphenyl)-1,3,5-triazine; hydroxybenzophenone U.V. absorbers, such as, 2,4-dihydroxybenzophenone, 2-hydroxy-4-octyloxybenzophenone, and 2-hydroxy-4-dodecyloxybenzophenone.

Typical antioxidants that are suitable for use herein can include tetrakis[methylene(3,5-di-tert-butylhydroxy hydrocinnamate)]methane, octadecyl 3,5-di-tert-butyl-4-hydroxyhydrocinnamate, tris(2,4-di-tert-butylphenyl) phosphite, 1,3, 5-tris(3,5-di-tert-butyl-4-hydroxybenzyl)-1,3,5-triazine-2,4, 6-(1H,3H,5H)-trione and benzenepropanoic acid, 3,5-bis(1, 1-dimethyl-ethyl)-4-hydroxy-C7-C9 branched alkyl esters. Typically useful antioxidants can also include hydroperoxide decomposers, such as SANKO® HCA (9,10-dihydro-9-oxa-10-phosphenanthrene-10-oxide), triphenyl phosphate and other organo-phosphorous compounds, such as, IRGAFOS® TNPP from Ciba Specialty Chemicals, IRGAFOS® 168, from Ciba Specialty Chemicals, ULTRANOX® 626 from GE Specialty Chemicals, IRGAFOS® P-EPQ from Ciba Specialty Chemicals, ETHANOX® 398 from Albemarle, Weston 618 from GE Specialty Chemicals, IRGAFOS® 12 from Ciba Specialty Chemicals, IRGAFOS® 38 from Ciba Specialty Chemicals, ULTRANOX® 641 from GE Specialty Chemicals and DOVERPHOS® S-9228 from Dover Chemical, Dover, Ohio.

Typical hindered amine light stabilizers can include N-(1, 2,2,6,6-pentamethyl-4-piperidinyl)-2-dodecyl succinimide, N-(1-acetyl-2,2,6,6-tetramethyl-4-piperidinyl)-2-dodecyl succinimide, N-(2-hydroxyethyl)-2,6,6,6-tetramethylpiperidine-4-ol-succinic acid copolymer, 1,3,5-triazine-2,4,6-triamine, N,N'''-[1,2-ethanediybis[[[4,6-bis[butyl(1,2,2,6,6-pentamethyl-4-piperidinyl)amino]-1,3,5-triazine-2-yl] imino]-3,1-propanediyl]]bis-[N,N'''-dibutyl-N',N''-bis-(1,2, 2,6,6-pentamethyl-4-piperidinyl)], bis(2,2,6,6-tetramethyl-4-piperidinyl)sebacate, bis(1,2,2,6,6-pentamethyl-4-piperidinyl)sebacate, bis(1-octyloxy-2,2,6,6-tetramethyl-4-piperidinyl)sebacate, bis(1,2,2,6,6-pentamethyl-4-piperidinyl)[3,5-bis(1,1-dimethylethyl-4-hydroxy-phenyl) methyl]butyl propanedioate, 8-acetyl-3-dodecyl-7,7,9,9,-tetramethyl-1,3,8-triazaspiro(4,5)decane-2,4-dione, and dodecyl/tetradecyl-3-(2,2,4,4-tetramethyl-21-oxo-7-oxa-3, 20-diaza dispiro(5.1.11.2)henicosan-20-yl)propionate.

The coating compositions contemplated herein can comprise conventional coating additives. The aforementioned additives or a combination thereof can be suitable. Further examples of such coating additives can include wetting agents, leveling and flow control agents, for example, RESIFLOW®S (polybutylacrylate), BYK® 320 and 325 (high molecular weight polyacrylates), BYK® 347 (polyether-modified siloxane), leveling agents based on (meth) acrylic homopolymers; rheological control agents, such as highly disperse silica, or fumed silica; thickeners, such as partially crosslinked polycarboxylic acid or polyurethanes; and antifoaming agents. The additives are used in conventional amounts familiar to those skilled in the art.

Following step 4) forming the coating composition by mixing together the first and the second coating mixtures, the viscosity of the coating composition can be further adjusted to spray viscosity with water and/or organic solvents as determined by those skilled in the art before being applied to the substrate.

A layer of the coating composition of this disclosure can be applied to the substrate using typical coating application methods or process, such as spraying, brushing, dipping, roller coating, drawn down, or a combination thereof, as known to or developed by those skilled in the art. The substrate can be a vehicle, a vehicle part, or a combination thereof.

The applied coating layer can be cured, in some embodiments, at a temperature in a range of from about 10° C. to about 32° C. to form the coating layer. In another embodiments, the substrate coated with the wet coating layer can be cured at a temperature in a range of from about 32° C. to about 82° C.

This disclosure is also related to a substrate coated by the previously described process. The substrate can be any article or object that can be coated with a coating composition. The substrate can include a vehicle, parts of a vehicle, or a combination thereof. The coating composition according to the disclosure can be suitable for vehicle and industrial coating and can be applied using known processes. In the context of vehicle coating, the coating composition can be used both for vehicle original equipment manufacturing (OEM) coating and for repairing or refinishing coatings of vehicles and vehicle parts. Curing of the coating composition can be accomplished at temperatures in a range of from about 10° C. to about 82° C.

This disclosure is further directed to a substrate coated by the aforementioned process. Examples of coated substrate can include, but not limited to home appliances, such as refrigerators, washing machines, dishwashers, microwave ovens, cooking and baking ovens; electronic appliances, such as television sets, computers, electronic game sets, audio and video equipment; recreational equipment, such as bicycles, ski equipment, all-terrain vehicles; and home or office furniture, such as tables, file cabinets. In one example, the coated substrate is a vehicle or parts of a vehicle.

EXAMPLES

Unless otherwise specified, all ingredients are available from the Aldrich Chemical Company, Milwaukee, Wis.

Clearcoat 572P®, FG-572® isocyanate activator and VG-805® catalyst are available from DuPont, Wilmington, Del.

CYMEL® XW-3106 melamine and CYCAT® 600 acid catalyst are available from Cytec Industries Inc., Woodland Park, N.J.

Gassing resistance was tested by applying each coating composition onto a glass plate using drawdown blades with various gap sizes (with a 305 micrometer gap being the largest). After the coatings cured, they were visually inspected for the presence of bubbles. The minimum gap size, at which bubbles were present was recorded as the gassing resistance.

Dry to touch time is determined according to ASTM D-1640.

The following examples were conducted to show the effect of an induction time on a coating composition. In Table 1, the amounts of the ingredients are in parts by weight (pbw).

To prepare Coating Example 1, 15 pbw of Clearcoat 572P® was added to a suitable mixing vessel. Next, 5 pbw of FG-572® activator and 0.5 pbw of VG-805® catalyst was added to the clearcoat and the mixture was stirred for 20 minutes. At the end of the 20 minute maturation time, 2 pbw of CYMEL® XW-3106 melamine and 1 pbw CYCAT® 600 acid catalyst was added to the mixing vessel.

To prepare Comparative Coating Example A, 15 pbw of Clearcoat 572P® was added to a mixing vessel followed by 10 pbw of CYMEL® XW-3106 melamine and 1 pbw CYCAT® 600 acid catalyst. The mixture was stirred to form the coating composition.

To prepare Comparative Coating Example B, 15 pbw of Clearcoat 572P® was added to a suitable mixing vessel. Next, 10 pbw of FG-572® activator, 0.5 pbw of VG-805® catalyst were added to the clearcoat. There was essentially no maturation period between the addition of the activator, the catalyst and the melamine.

To prepare Comparative Coating Example C, 15 pbw of Clearcoat 572P® was added to a suitable mixing vessel. Next, 5 pbw of FG-572® activator, 0.5 pbw of VG-805® catalyst, 5 pbw of CYMEL® XW-3106 melamine and 1 pbw CYCAT® 600 acid catalyst was added to the mixing vessel. There was essentially no maturation period between the addition of the activator, the catalyst, the melamine and the acid catalyst.

Each of the prepared coating compositions were applied in one coat to electrocoated cold rolled steel panels available from ACT Panels LLC, Hillsdale, Mich. The coating compositions were applied to achieve a dry film thickness of about 51 micrometers (μm). The panels were then allowed to dry at ambient temperature.

TABLE 1

| | Coating Example 1 | Coating Example 2 | Comparative Coating Example A | Comparative Coating Example B | Comparative Coating Example C |
|---|---|---|---|---|---|
| PART A | | | | | |
| Clearcoat 572P ® | 15 | 15 | 15 | 15 | 15 |
| PART B | | | | | |
| FG-572 ® activator | 5 | 5 | 0 | 10 | 5 |
| VG-805 ® catalyst | 0.5 | 0 | 0 | 0.5 | 0.5 |
| Induction Time | 20 minutes | 40 minutes | 0 minutes | 0 minutes | 0 minutes |
| PART C | | | | | |
| CYMEL ® XW-3106 | 5 | 5 | 10 | 0 | 5 |
| CYCAT ® 600 | 1 | 1 | 1 | 0 | 1 |
| RESULTS | | | | | |
| Dry Film Thickness (μm) | 51 | 51 | 51 | 51 | 51 |
| Dry to Touch time (hours) | 3 | 5 | No cure | 1 | 18 |
| 60° Gloss | 91 | 92 | No cure | 91 | 70 |
| Gassing Resistance (μm) | >305 | >305 | No cure | 254 | >305 |

The results of these experiments show that Coating examples 1 and 2 show the best combination of dry to touch time, gloss and gassing resistance when compared to any of the comparative coating example. Comparative coating example A having no isocyanate fails to form a cured coating. Comparative coating example B, containing none of the melamine has a gassing resistance which is much lower than coating example 1 or 2. Comparative coating example C having all of the ingredients of coating example 1 but lacking the maturation time that coating example 1 was given has a significantly longer dry to touch time and much lower gloss.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A process for forming a layer of a coating composition on a substrate comprising the steps of:
    forming a first coating mixture, said first coating mixture comprising:
        a film forming polymer having at least two different functional groups, a hydroxyl group and an amine neutralized carboxylic acid group, and
        a polyisocyanate,
    allowing said first coating mixture to mature for about 0.5 to about 60 minutes,
    forming a second coating mixture, said second coating mixture comprising:
        an alkylated melamine that is essentially unreactive to isocyanates; and
        an acid catalyst,
    forming the coating composition by mixing together the matured first coating mixture and the second coating mixture,
    applying a layer of the coating composition onto the substrate; and
    curing the applied layer of coating composition.

2. The process of claim 1 wherein forming a first coating mixture comprises forming the first coating mixture further comprising a catalyst.

3. The process of claim 2, wherein forming a first coating mixture comprises forming the first coating mixture comprising the catalyst chosen from dibutyl tin dilaurate, dibutyl tin diacetate, dibutyl tin dichloride, dibutyl tin dibromide, zinc naphthenate; triphenyl boron, tetraisopropyl titanate, triethanolamine titanate chelate, dibutyl tin dioxide, dibutyl tin dioctoate, tin octoate, aluminum titanate, aluminum chelates, zirconium chelate, ethyl triphenyl phosphonium iodide or a combination thereof.

4. The process of claim 1, wherein the curing is conducted at a temperature in the range of from about 10° C. to about 32° C.

5. The process of claim 1 wherein the curing is conducted at a temperature in the range of from about 32° C. to about 82° C.

6. The process of claim 1, wherein forming the second coating mixture comprises forming the second coating mixture with the acid catalyst chosen from a carboxylic acid, a sulfonic acid, a phosphoric acid and a combination thereof.

7. The process of claim 1, wherein forming the second coating mixture comprises forming the second coating mixture with the alkylated melamine chosen from hexamethoxymethylmelamine and hexabutoxymethylmelamine.

8. The process of claim 1, wherein the coating composition is a waterborne coating composition comprising in the range of from about 50 to 100 percent by weight of water, based on the total amount of liquid carrier in the coating composition.

9. The process of claim 1, wherein the second coating mixture is formed prior to forming the first coating mixture or wherein the second coating mixture is formed during the maturation period of the first coating mixture.

10. The process of claim 1, wherein the coating composition is a primer, a basecoat, a topcoat or a clearcoat.

11. A process for producing a coating composition, the process comprising the steps of:
    forming a first coating mixture, the first coating mixture comprising:
        a film-forming polymer having at least two different functional groups, a hydroxyl group and an amine neutralized carboxylic acid group, and
        a polyisocyanate;
    allowing the first coating mixture to mature for about 0.5 to about 60 minutes,
    forming a second coating mixture, the second coating mixture comprising:
        an alkylated melamine that is essentially unreactive to isocyanates; and
        an acid catalyst, and
    forming the coating composition by mixing together the matured first coating mixture and the second coating mixture.

12. The process of claim 11, wherein the forming the first coating mixture comprises forming the first coating mixture further comprising a catalyst.

13. The substrate process of claim 12, wherein forming the first coating mixture further comprising the catalyst comprises forming the first coating mixture using a catalyst chosen from dibutyl tin dilaurate, dibutyl tin diacetate, dibutyl tin dichloride, dibutyl tin dibromide, zinc naphthenate; triphenyl boron, tetraisopropyl titanate, triethanolamine titanate chelate, dibutyl tin dioxide, dibutyl tin dioctoate, tin octoate, aluminum titanate, aluminum chelates, zirconium chelate, ethyl triphenyl phosphonium iodide and a combination thereof.

14. The process of claim 11, wherein forming the second coating mixture comprising the acid catalyst comprises forming the second coating mixture comprising the acid catalyst chosen from a carboxylic acid, a sulfonic acid, a phosphoric acid and a combination thereof.

15. The substrate process of claim 11, wherein forming the second coating mixture comprising the alkylated melamine comprises forming the second coating mixture comprising the alkylated melamine chosen from hexamethoxymethylmelamine and hexabutoxymethylmelamine.

16. The substrate process of claim 11, wherein the coating composition is a waterborne coating composition comprising in the range of from about 50 to about 100 percent by weight of water, based on the total amount of liquid carrier in the coating composition.

17. The process of claim 11, wherein the second coating mixture is formed prior to forming the first coating mixture or wherein the second coating mixture is formed during the maturation period of the first coating mixture.

18. The process of claim 11, wherein the coating composition is a primer, a basecoat, a topcoat or a clearcoat.

19. The process of claim 11, wherein forming a first coating mixture comprises forming a first coating mixture comprising a film-forming polymer with a hydroxyl number in the range of from about 10 to about 200 mg KOH/g polymer.

20. The process of claim 11, wherein forming a first coating mixture comprises forming a first coating mixture comprising a film-forming polymer chosen from (meth)acrylic polymers, polyester polymers, polyurethane polymers, alkyd resins and combinations thereof.

* * * * *